US008741421B2

(12) United States Patent
Hansson et al.

(10) Patent No.: US 8,741,421 B2
(45) Date of Patent: Jun. 3, 2014

(54) PROCESS FOR THE MANUFACTURING OF SURFACE ELEMENTS WITH A STRUCTURED TOP SURFACE (75) Inventors: Krister Hansson, Trelleborg (SE); Johan Lundgren, Malmo (SE); Hakan Wernersson, Lund (SE)

(73) Assignee: Pergo (Europe) AB, Trelleborg (SE)

( * ) Notice: Subject to any disclaimer, the term of this patent is extended or adjusted under 35 U.S.C. 154(b) by 79 days.

(21) Appl. No.: 11/118,780

(22) Filed: May 2, 2005

(65) Prior Publication Data
US 2005/0281993 A1 Dec. 22, 2005

Related U.S. Application Data (63) Continuation of application No. 09/718,381, filed on Nov. 24, 2000, now Pat. No. 6,888,147.

(30) Foreign Application Priority Data

Dec. 23, 1999 (SE) ...................................... 9904781

(51) Int. Cl.
*B41M 5/00* (2006.01)
(52) U.S. Cl.
USPC ........ 428/195.1; 428/143; 428/142; 428/145; 428/150; 428/151; 428/153; 428/156; 428/170; 428/173; 428/177; 156/76; 156/275.5
(58) Field of Classification Search
CPC ....................................................... B41M 5/00

USPC ............. 428/195.1, 173, 170, 177, 156, 157, 428/153, 142–143, 145, 150–151; 156/76, 156/275.5
See application file for complete search history.

(56) References Cited

U.S. PATENT DOCUMENTS

| 2,226,607 | A | * | 12/1940 | Gilmore et al. ................. 51/298 |
| 3,660,187 | A | * | 5/1972 | Shortway et al. ............... 156/79 |
| 3,811,915 | A | * | 5/1974 | Burrell et al. ................. 428/143 |
| 3,914,485 | A | * | 10/1975 | Curtis ............................ 428/71 |
| 4,002,790 | A | * | 1/1977 | Trewiler ....................... 428/212 |
| 4,008,401 | A | | 2/1977 | Holoubek et al. |
| 4,065,340 | A | | 12/1977 | Dickerson |
| 4,073,671 | A | | 2/1978 | Licata |
| 4,083,744 | A | * | 4/1978 | Degens ......................... 156/278 |
| 4,093,686 | A | * | 6/1978 | Briston et al. ................ 264/45.5 |
| 4,105,816 | A | * | 8/1978 | Hori .............................. 428/159 |
| 4,119,479 | A | | 10/1978 | Williams, Jr. et al. |
| 4,172,169 | A | * | 10/1979 | Mawson et al. ............... 428/159 |
| 4,186,044 | A | | 1/1980 | Bradley et al. |
| 4,340,707 | A | * | 7/1982 | Quis et al. ....................... 522/14 |
| 4,348,447 | A | * | 9/1982 | Miller et al. .................. 428/149 |
| 4,388,137 | A | | 6/1983 | McCarty et al. |
| 4,409,280 | A | * | 10/1983 | Wiley et al. ................... 428/203 |
| 4,440,826 | A | * | 4/1984 | Witman ........................ 428/327 |
| 4,500,373 | A | * | 2/1985 | Kubota ........................... 156/79 |

(Continued)

*Primary Examiner* — D. Lawrence Tarazano
*Assistant Examiner* — Tamra L Dicus
(74) *Attorney, Agent, or Firm* — Jenkins, Wilson, Taylor & Hunt, P.A.

(57) ABSTRACT

A process for the manufacturing of a decorative surface element, which element comprises a base layer and a decorative upper surface. A radiation curing lacquer is printed in a predetermined pattern as an uppermost layer on the decorative upper surface. The radiation curing lacquer covers only parts of the decorative upper surface whereby the lacquer is exposed to radiation whereby it cures. A surface structure is hereby achieved.

20 Claims, 2 Drawing Sheets

(56) References Cited

U.S. PATENT DOCUMENTS

| | | | |
|---|---|---|---|
| 4,532,157 A * | 7/1985 | Schmidt et al. | 427/262 |
| 4,559,371 A * | 12/1985 | Husler et al. | 522/14 |
| 4,604,312 A * | 8/1986 | Creighton et al. | 281/37 |
| 4,652,482 A * | 3/1987 | Diesel et al. | 428/151 |
| 4,670,321 A * | 6/1987 | Holmqvist | 428/168 |
| 4,675,212 A * | 6/1987 | Wiley et al. | 427/244 |
| 4,719,141 A * | 1/1988 | Collier | 428/144 |
| 4,789,604 A * | 12/1988 | van der Hoeven | 428/503 |
| 4,844,764 A | 7/1989 | Nablo et al. | |
| 4,916,007 A * | 4/1990 | Manning et al. | 428/203 |
| 5,169,707 A * | 12/1992 | Faykish et al. | 428/195.1 |
| 5,178,928 A * | 1/1993 | Goto et al. | 428/106 |
| 5,230,945 A * | 7/1993 | Dees et al. | 428/195.1 |
| 5,480,680 A * | 1/1996 | Vieyra | 427/388.4 |
| 5,656,363 A * | 8/1997 | Fuesser et al. | 428/212 |
| 5,702,806 A * | 12/1997 | O'Dell et al. | 428/206 |
| 5,824,395 A * | 10/1998 | Zemel | 428/195.1 |
| 5,858,160 A * | 1/1999 | Piacente et al. | 156/279 |
| 6,110,315 A | 8/2000 | Keding | |
| 6,129,872 A | 10/2000 | Jang | |
| 6,150,009 A * | 11/2000 | Stecker | 428/198 |
| 6,165,406 A | 12/2000 | Jang et al. | |
| 6,214,279 B1 | 4/2001 | Yang et al. | |
| 6,406,585 B1 * | 6/2002 | Taubert | 156/275.5 |
| 6,465,046 B1 * | 10/2002 | Hansson et al. | 427/256 |
| 6,555,593 B1 * | 4/2003 | Hoyle et al. | 522/63 |
| 6,565,919 B1 * | 5/2003 | Hansson et al. | 427/203 |
| 6,685,993 B1 * | 2/2004 | Hansson et al. | 427/551 |
| 6,759,105 B2 * | 7/2004 | Brooker et al. | 428/32.3 |
| 6,991,830 B1 * | 1/2006 | Hansson et al. | 427/504 |
| 7,141,295 B2 * | 11/2006 | Genzabella et al. | 428/195.1 |
| 2002/0061389 A1 * | 5/2002 | Brooker et al. | 428/195 |
| 2005/0175817 A1 * | 8/2005 | Lahti et al. | 428/195.1 |
| 2005/0193677 A1 | 9/2005 | Vogel | |
| 2007/0178285 A1 * | 8/2007 | Rasanen et al. | 428/195.1 |

\* cited by examiner

FIGURE 2

PROCESS FOR THE MANUFACTURING OF SURFACE ELEMENTS WITH A STRUCTURED TOP SURFACE

CROSS-REFERENCE TO RELATED APPLICATIONS

This application is a continuation application of U.S. patent application Ser. No. 09/718,381, filed Nov. 24, 2000, now U.S. Pat. No. 6,888,147, claiming priority of Swedish Application No. 9904781-3, filed Dec. 23, 1999, the entire disclosures of which are incorporated herein in their entirety.

BACKGROUND OF THE INVENTION

1. Field of the Invention.

The present invention relates to a process for the manufacturing of decorative surface elements with a surface structure matching the decor of the upper surface.

DESCRIPTION OF THE RELATED ART

Products coated with simulated versions of materials such as wood and marble are frequent today. They are foremost used where a less expensive material is desired, but also where resistance towards abrasion, indentation and different chemicals and moisture is required. As an example of such products floors, floor beadings, table tops, work tops and wall panels can be mentioned.

As an example of an existing product can be mentioned the thermosetting laminate which mostly consists of a number of base sheets with a decor sheet placed closest to the surface. The decor sheet can be provided with a desired decor or pattern. Frequently used patterns usually represent the image of different kinds of wood or minerals such as marble or granite. The surface of the laminate can, at the laminating procedure, be provided with a structure, which will make the decor more realistic. Press plates with structure or structure foils are here frequently used during the pressing of the laminate. A negative reproduction of the structure in the press plate or the foil will be embossed into the laminate surface during the laminating procedure.

The structure suitably represents features characteristic for the pattern the decor represents. The structure can be made coarse to simulate for example rough planed stone, or smooth with randomly placed pits and micro cracks to simulate polished marble. When the surface of wood is simulated the surface is provided with randomly placed thin oblong indentations which imitate pores.

It has for a long time been a great need to be able to manufacture simulated materials where a lacquer is used as a top coat on a decor. The only way, so far, to achieve a surface structure in lacquer is casting or abrasive moulding which both are time consuming and expensive processes.

SUMMARY OF THE INVENTION

The invention relates to a process for the manufacture of a decorative surface element. The element comprises a base layer, a decor and a wear layer of a UV or electron beam curing lacquer.

The design of the décor can be achieved by utilising the process steps below;

i) A segmentation pattern is selected, the segmentation comprising at least two décor segments on each surface element. The shape, as seen from above, of the surface element is hereby selected from the group; triangular, quadratic, rectangular, heptagonal, pentagonal and octagonal while the shape of the segments is selected from the group triangular, quadratic, rectangular, heptagonal, pentagonal, octagonal, circular, elliptical, perturbed and irregular.

ii) A segment décor is then selected for each segment. The segment décor is selected from the group; digitised and simulated depiction of different kinds of wood, minerals and stone, different kinds of fabric, art work and fantasy based décor.

iii) Each selection is made on a terminal where the selections emanates from a data base and that the selection is visualised via the terminal.

The décor is preferably achieved by digitisation of an actual archetype or by partly or completely being created in a digital media. The digitised décor is preferably stored digitally in order to be used as a control function and original, together with control programs and selection parameters, when printing the décor.

The dimensions of the surface to be covered by surface elements is suitably entered into the terminal and support programs calculates an installation pattern. The installation pattern calculation is suitably also used for printing an assembly instruction. In order to visualise the selection the installation pattern calculation is possibly used for printing a miniaturised copy of the calculated installation with the selected pattern and décor. The dimensions of the surface to be covered by surface elements is suitably entered into the terminal and that that support programs further calculates décor and segmentation pattern matching between the surface elements.

The selections is preferably also used, together with support programs for controlling further steps in the manufacturing procedure selected from the group; identification marking, positioning marking, packaging, lacquering, surface embossing, storing and delivery logistics.

An algorithm is suitably used for guiding the positioning of the décor segments and segmentation pattern so that a décor segment from one surface element may continue on an adjoining surface element. The control program is suitably used, together with décor data and selection parameters, for applying matching identification on the surface elements.

It is also possible to manufacture a designed larger surface with décor segments larger than a surface element by utilising the process as described below;

i) A selected main décor is entered via a terminal, the selected décor emanating from a group consisting of; an archetype digitised via digital camera or scanner and a digitised décor from a database.

ii) The dimensions of the surface to be covered by surface elements and the desired dimension of the décor is then entered into the terminal. Support programs are used for calculating the segmentation of the main décor to cover more than one surface element.

iii) The result of the selections and calculations is finally visualised via the terminal.

The digitised main décor is stored digitally in order to be used as a control function and original, together with control programs and selection parameters, when printing the décor.

It is, in order to enhance the decorative effect of some decor possible to select a surrounding décor. A décor effect in the border between the main décor and the surrounding décor is suitably also selected, the selection being made from the group; fading, sharp edge, sharp edge with shadow effect, jagged edge, jagged edge with shadow and surrounding inlay of other décor.

The surrounding décor is preferably processed as follows;
i) A segmentation pattern for the surrounding décor is selected. The segmentation comprising at least two décor segments on each surface element. The shape, as seen from above, of the surface element is preferably selected from the group; triangular, quadratic, rectangular, heptagonal, pentagonal and octagonal. The shape of the surface elements with surrounding décor and the shape of the surface elements which, of course, is selected so that they can be joined with each other. The shape of the segments is selected from the group triangular, quadratic, rectangular, heptagonal, pentagonal, octagonal, circular, elliptical, perturbed and irregular.
ii) A segment décor is then selected for each segment. The segment décor is selected from the group; digitised and simulated depiction of different kinds of wood, minerals and stone, different kinds of fabric, art work and fantasy based décor.
iii) Each selection is made on a terminal where the selections emanates from a data base. The selection is visualised via the terminal.

A décor effect in the border between the main décor and the surrounding décor is suitably selected. The selection is preferably made from the group; fading, sharp edge, sharp edge with shadow effect, jagged edge, jagged edge with shadow and surrounding inlay of other décor. Also this selection is made on the terminal.

The dimensions of the surface to be covered by surface elements is suitably entered into the terminal and support programs calculates an installation pattern. The installation pattern calculation is preferably used for printing an assembly instruction. The installation pattern calculation is according to one embodiment of the invention used for printing a miniaturised copy of the calculated installation with the selected pattern and décor. This print out may serve as an evaluation copy of the design before making decisions regarding the manufacturing.

The dimensions of the surface to be covered by surface elements is entered into the terminal. Support programs further calculates décor and segmentation pattern matching between the surface elements. The selections is preferably used, together with support programs for controlling further steps in the manufacturing procedure selected from the group; identification marking, positioning marking, packaging, lacquering, surface embossing, storing and delivery logistics. An algorithm is preferably used for guiding the positioning of the décor segments and segmentation pattern so that a décor segment from one surface element may continue on an adjoining surface element. The control program is then preferably used together with décor data and selection parameters for applying matching identification on the surface elements.

The surface elements may be used as floor, wall or ceiling boards. The surface elements are suitably manufactured through the following process;
i) A supporting core with a desired format is manufactured and provided with an upper side and a lower side.
ii) The upper side of the supporting core is then provided with a décor, by for example printing. The décor is positioned after a predetermined fixing point on the supporting core.
iii) The upper side of the supporting core is then provided with a protecting, at least partly translucent, wear layer by for example spray coating, roller coating, curtain coating and immersion coating or by being provided with one or more sheets of α-cellulose impregnated with thermosetting resin or lacquer.

The décor is suitably achieved by digitisation of an actual archetype or by partly or completely being created in a digital media. The digitised décor is stored digitally in order to be used as a control function and original, together with possible control programs, when printing the décor.

The décor may accordingly be obtained by making a high resolution or selected resolution digital picture of the desired décor. This is suitably made by means of a digital camera. The most common décor will of course be different kinds of wood and minerals like marble, as these probably will continue to be preferred surface decoration in home and public environments. It is, however, possible to depict anything that is visible. The digitised version of the décor is then edited to fit the size of the supporting core. It is also possible to rearrange the décor in many different ways, like changing colour tones, contrast, dividing the décor into smaller segments and adding other decorative elements. It is also possible to completely create the décor in a computer equipped for graphic design. It is possible to create a simulated décor so realistic that even a professional will have great problems in visually separating it from genuine material. This makes it possible to make for example floor boards with an almost perfect illusion of a rare kind of wood, like ebony or rose wood and still preserving trees under threat of extermination.

The digital décor is used together with guiding programs to control a printer. The printer may be of an electrostatic type or an inc-jet type printer. The resolution needed is much depending on the décor that is to be simulated, but resolutions of 10-1500 dots per inch (dpi) is the practical range in which most décor will be printed. Under normal conditions a resolution of 300-600 dpi is sufficient when creating simulations of even very complex decorative patterns and still achieve a result that visually is very difficult to separate form the archetype without close and thorough inspection.

The digitally stored décor can also be used together with support programs when guiding other operations and procedures in the manufacturing process. Such steps in the operation may include procedures like identification marking, packaging, lacquering, surface embossing, storing and delivery logistics as well as assembly instructions.

DETAILED DESCRIPTION OF THE INVENTION

It is advantageous to manufacture the supporting core in the desired end user format and to provide it with edges suited for joining before applying the décor and wear layer, since the amount of waste thereby is radically reduced. The décor matching tolerances will also be improved further by this procedure.

The main part of the supporting core is suitably constituted by a particle board or a fibre board. It is, however, possible to manufacture the core that at least partly consist of a polymer such as for example polyurethane or a polyolefin such as polyethylene, polypropylene or polybutene. A polymer based core can be achieved by being injection moulded or press moulded and can be given its shape by plastic moulding and does therefore not require any abrasive treatment. A polymer based core may except polymer also contain a filler in the form of a particle or fibre of organic or inorganic material, which besides the use a cost reducing material also will be used to modify the mechanical characteristics of the core. As an example of such suitable fillers can be mentioned; cellulose or wood particles, straw, starch, glass, lime, talcum, stone powder and sand. The mechanical characteristics that may be changed is for example viscosity, thermal coefficient of expansion, elasticity, density, fire resistance, moisture absorption capacity, acoustic properties, thermal conductivity, flexural and shearing strength as well as softening temperature.

The upper surface, i.e. the surface that is to be provided with décor, is suitably surface treated before the printing. Such surface treatment will then incorporate at least one of the steps, ground coating and sanding. It is also possible to provide the surface with a structure that matches the décor that is to be applied.

The translucent wear layer is suitably constituted by a UV- or electron beam curing lacquer such as an acrylic, epoxy, or maleimide lacquer. The wear layer is suitably applied in several steps with intermediate curing where the last one is a complete curing while the earlier ones are only partial. It will hereby be possible to achieve thick and plane layers. The wear layer suitably includes hard particles with an average particle size in the range 50 nm-150 µm. Larger particles, in the range 10 µm-150 µm, preferably in the range 30 µm-150 µm, is foremost used to achieve abrasion resistance while the smaller particles, in the range 50 nm-30 µm, preferably 50 nm-10 µm is used for achieving scratch resistance. The smaller particles is hereby used closest to the surface while the larger ones are distributed in the wear layer. The hard particles are suitably constituted of silicon carbide, silicon oxide, α-aluminium oxide and the like. The abrasion resistance is hereby increased substantially. Particles in the range 30 mm-150 mm can for example be sprinkled on still wet lacquer so that they at, least partly, becomes embedded in finished wear layer. It is therefore suitable to apply the wear layer in several steps with intermediate sprinkling stations where particles are added to the surface. The wear layer can hereafter be cured. It is also possible to mix smaller particles, normally particle sizes under 30 µm with a standard lacquer. Larger particles may be added if a gelling agent or the like is present. A lacquer with smaller particles is suitably used as top layer coatings, closer to the upper surface. The scratch resistance can be improved by sprinkling very small particles in the range 50 nm-1000 nm on the uppermost layer of lacquer. Also these, so called nano-particles, can be mixed with lacquer, which with is applied in a thin layer with a high particle content. These nano-particles may besides silicon carbide, silicon oxide and α-aluminium oxide also be constituted of diamond.

The décor on the surface elements is suitably constituted by a number of décor segments with intermediate borders, which borders, on at least two opposite edges coincides with intended, adjacent surface elements.

Thus, the invention relates to a process for providing the decorative surface elements with a surface structure that in all essential aspects matches the décor. The decorative surface element also comprises a base layer and a decorative upper surface. The invention is characterised in that a radiation curing lacquer is printed in a predetermined pattern as an uppermost layer on the decorative upper surface. The radiation curing lacquer is covering only parts of the decorative upper surface. The lacquer is then exposed to radiation whereby it cures whereby a surface structure is achieved. The radiation curing lacquer is preferably cured by UV or electron beam radiation and consists of an acrylic, epoxy or a maleimide lacquer. The radiation curing lacquer is suitably applied in several steps with intermediate curing.

According to one embodiment of the invention the radiation curing lacquer includes hard particles with an average particle size in the range 50 nm-150 µm. These hard particles consists of for example silicon oxide, α-aluminium oxide or silicon carbide. The main part of the hard particles preferably consists of for example silicon oxide, α-aluminium oxide or silicon carbide while a smaller amount of the hard particles consist of diamond. The hard particles consisting of diamond is suitably in the average particle size range 50 nm-2 µm and is placed close to the upper surface of the wear layer.

The radiation curing lacquer is suitably translucent and is applied by means of an ink-jet printer. The radiation curing lacquer may alternatively be semi-translucent. The radiation curing lacquer may according to one alternative include a matting agent which creates a structure enhancing effect in the structure.

According to a preferred embodiment of the invention the decorative upper layer further comprises a decor layer and a wear layer, which wear layer is applied on top of the decor layer whereby the radiation curing lacquer is applied on top of the wear layer. The wear layer suitably comprises UV or electron beam curing lacquer of an acrylic, epoxy or a maleimide lacquer which is cured before the step where the uppermost, structured layer is applied. The wear layer preferably comprises hard particles with an average particle size in the range 50 nm-150 µm. The hard particles of the wear layer preferably consists of for example silicon oxide, α-aluminium oxide or silicon carbide.

The decorative upper surface comprises a decor layer, which decor layer preferably originates from a digitally stored original. The digitally stored original is then processed in order to achieve a digital structure original whereby a surface structure that in every essential aspect matches the decor is achieved. This digital structure original is used together with control or support programs for guiding the ink-jet printer used for printing the radiation curing lacquer of the uppermost, structured layer.

According to one embodiment of the invention the surface structure is achieved by utilising the following steps;
i) The radiation curing lacquer is printed in a predetermined pattern on the decorative upper surface. The radiation curing lacquer is printed so that it covers only parts of the decorative upper surface. The amount of surface covered by the radiation curing lacquer may of course be selected by desire, but it is advantageous to cover the surface to an amount greater than 50%, preferably greater than 75%, in order to achieve an abrasion resistant surface structure.
ii) Hard particles with an average particle size in the range 1-150 µm is then sprinkled on the still sticky printed lacquer to an amount of 5-30 g/m$^2$.
iii) The lacquer is then exposed to radiation so that it cures.
iv) Possible residual particles are removed by blowing air over the surface
v) A layer of UV or electron beam curing lacquer is then applied on the decorative upper surface in one or more steps, so that the particles becomes, at least mainly, embedded in the lacquer.

It is according to the present invention possible to achieve matching structure on even particularly characteristic décor segments such as borderlines between simulated slabs, bars, blocks or the like and also knots, cracks, flaws and grain which is visually simulated in the décor. The structure may be stored as digital data. Said data may be used for guiding automated printers when providing said characteristic décor segments with a suitable surface structure. Said printing process is synchronised via the predetermined fixing point on the surface element.

The process described in the present application, for manufacturing surface elements is very advantageous from a logistic point of view since the number of steps when achieving a new décor is radically reduced. It is, according to the present invention possible to use digitally created or stored data for directly printing the décor on a surface element by using a ink-jet printer or a photo-static printer. The so-called set up time will thereby be very short, whereby even very special customer requirements may be met at a reasonable cost. It is according to the present invention possible to manufacture, for example, a world map with matching surface structure in very large format, stretching over a great number of surface elements without any disrupting deviations in décor and structure matching, to mainly the same cost as bulk produced surface elements. Since the décor and surface structure may be handled digitally all the way to the point of being applied to the surface of the core, set up times will be practically non-existent while at the same time a high degree of automation will be practicable. It is also possible to automatically provide the surface elements with identification and orientation marking which would make the installation of complex décor, like world maps in the example above, much easier. This has so far been impossible.

Surface elements manufactured as described above is suitably used as a floor covering material where the demands on stability and scratch and abrasion resistance is great. It is, according to the present invention, also possible to use the surface elements as wall and ceiling decorative material. It will however not be necessary to apply thick wear layer coatings in the latter cases as direct abrasion seldom occurs on such surfaces.

The invention is described further in connection to an enclosed figure, embodiment examples and schematic process descriptions showing different embodiments of the invention.

BRIEF DESCRIPTION OF THE DRAWINGS

Accordingly.

Figure 1:
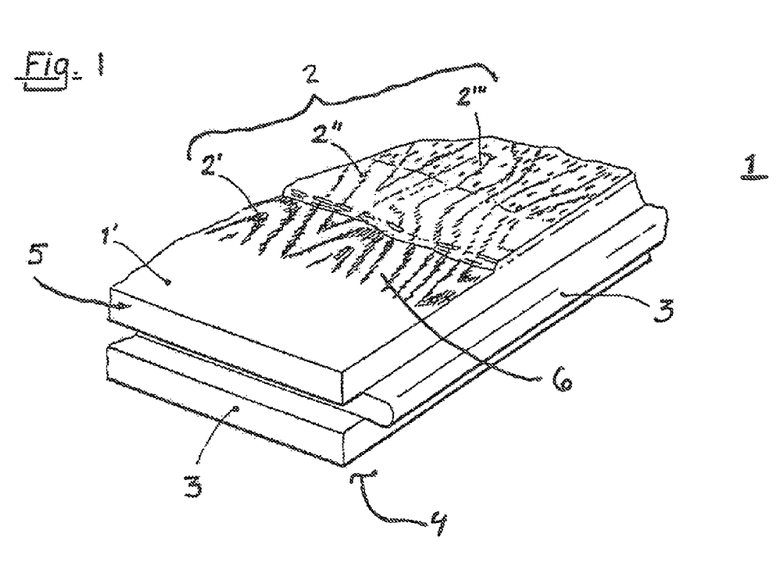
FIG. 1 shows parts of a surface element 1 which includes an upper decorative layer 2, edge 3 intended for joining, a lower side 4 and a supporting core 5. The process is initiated by manufacturing a supporting core 5 with a desired format and edges 3 intended for joining. The supporting core 5 is further provided with an upper side 1' suited for printing and a lower side 4. The upper surface 6 of the upper side 1' of the supporting core 5 is then provided with a décor 2' by printing, utilising an ink-jet printer. The décor 2' is oriented after a predetermined fixing point on the supporting core 5. The upper side 1' of the supporting core 5 is provided with a protecting translucent wear layer 2" through curtain coating. The supporting core 5 is constituted by particle board or fibre board. The translucent wear layer 2" is constituted by a UV-curing acrylic lacquer which is applied in several steps with intermediate curing, of which the last one is a complete curing while the earlier ones are only partial curing. The wear layer 2" also includes hard particles of α-aluminum oxide with an average particle size in the range 0,5µgm-150µm.
Figure 2:
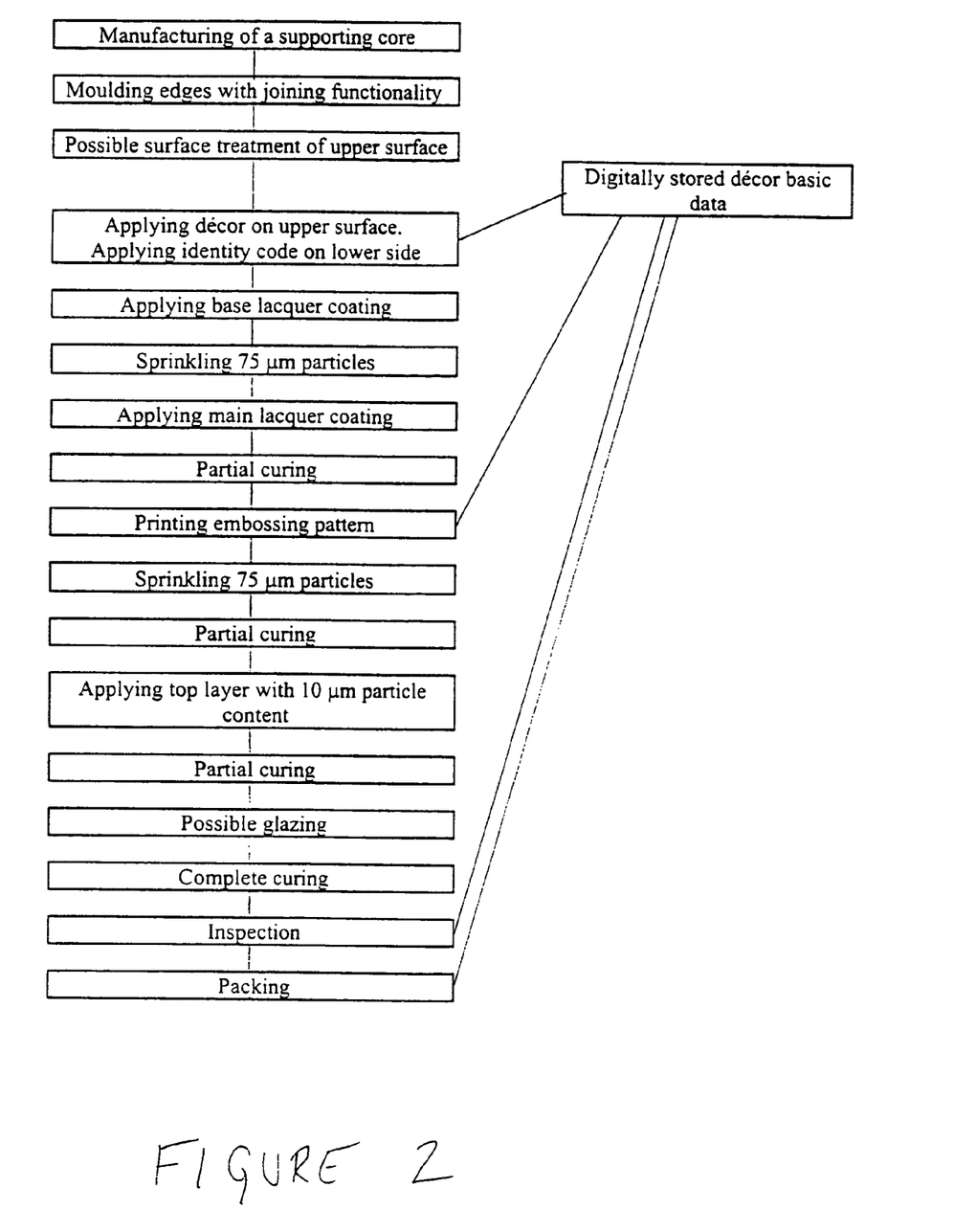
FIG. 2 is a schematic representation of a process scheme in accordance with the invention which can be read from top to bottom.

The décor side of the surface element 1 is provided with a surface structure 2'" which enhances the realism of the décor 2'. It possible to simulate the surface structure of, for example, wood block chevron pattern décor.

A supporting polymer and filler based core is manufactured in the desired format and is provided with an upper side, a lower side and edges provided with joining members, such as tongue and groove. The upper side of the supporting core is then sanded smooth after which a primer is applied. A décor is then applied on the upper side by means of a digital photo-static five colour printer. The colours are magenta, yellow, cyan, white and black. The décor is positioned from a predetermined fixing point in form of a corner of the supporting core, while the décor direction is aligned with the long side edge initiating from the same corner.

The basis for the décor is stored as digital data. This digital data has been achieved by digitising a number of wood grain patterns with a digital camera. A number of rectangular blocks with a fixed width, but of varying length is selected and parted from the digital wood grain pictures. The width of the rectangular blocks is selected so that three block widths equals the width of a supporting core. The digital image of the wood blocks are then classified after wood grain pattern and colour so that a number of groups is achieved. The groups are; fair wood with even grain, dark wood with even grain, fair wood with knots and flaws, dark wood with knots and flaws, fair cross-grained wood and finally dark cross-grained wood. Each group contains five different block simulations. An algorithm is feed into a computer which is used for the guiding of the printing operation so that the simulated wood blocks is digitally placed in three longitudinal rows and mixed so that two similar wood blocks never is placed next to each other. The algorithm will also guide the position of the latitudinal borderlines between the simulated wood blocks so that they are unaligned with more than one block width between adjacent rows. It will also guide the latitudinal position of the borderlines so that it either aligns with the shorter edges of the supporting core or is unaligned with more than one block width. Another printer, also guided by the computer, is utilised for printing a running matching number on the lower side short side edges. The décor will hereby continue longitudinally over the surface elements and a perfect matching is obtained when the surface elements are placed in numerical order.

A basic layer of UV-curing acrylic lacquer is then applied by means of a rollers. Particles with an average particle size in the range 75 μm is then sprinkled onto the still wet second basic layer which then is cured to a desired viscosity, whereby the main layer of UV-curing acrylic lacquer is applied by roller coating. The lacquer is then cured using UV-light whereby the viscosity of the lacquer increases.

The surface structuring is then initiated by printing the part of the structure that is to form elevations in the finished surface. A UV-curing acrylic lacquer is printed by means of an ink-jet printer in the desired pattern. The pattern is made up by larger areas containing non coated narrow lines of varying length and spots and will cover more than 95% of the total surface of the surface element. The ink-jet printer is controlled by a computer where the digital décor used earlier is processed to receive a digital structure matching the décor in aspects like grain direction and density, flaws, knots and border lines between simulated wood blocks. This processing may be achieved by an automatic process where an algorithm is used as a digital filter or by manual operation during the scanning procedure. It is also possible to scan the actual structure of the archetype. By this procedure a surface structure matching all essential aspects of the décor is achieved.

Particles with an average particle size in the range 75 μm is then sprinkled onto the still wet printed structure layer. The lacquer is then cured using UV-light to a desired viscosity. A top layer of UV-curing acrylic lacquer with an additive in the form of hard particles with an average size of 10 μm, is then gently applied by means of a hard roller so that the only particle coated part of the surface absorbs the lacquer. The lacquer is then cured with UV-light to a desired viscosity. It may, in some cases, be advantageous to perform a glazing operation on the top surface in order to make the edges between the main upper surface and the recesses more well defined. This is suitably achieved by pressing a heated roller towards the surface. The surface temperature of the roller is then suitably between 40 and 150° C.

The lacquer is then, if not already completely cured at a prior stage in the process, completely cured with UV-light to desired strength. The finished surface elements may then be inspected by the naked eye or by a digital camera supported by a computer. The surface elements are then packed in batches which are provided with identification markings.

The process above will make it possible to have a completely customer driven manufacturing where even very small quantities may be produced with the same efficiency as bulk manufacturing. Even though only one décor is described in connection to the process scheme above, it becomes clear to anyone skilled in the art, that a décor is changed very easily in the process. All of the important steps of the manufacturing such as printing, structuring, inspection, packaging and identification marking may be controlled and supervised by central processing data. This will make it logistically possible to manufacture customer designed décor. Such a process is exemplified as follows;

The customer utilises a database via Internet or at a local dealer. It is also possible for another operator utilise a database. The database contains samples and/or reduced resolution copies of a great variety of standard décor which can be combined after predetermined parameters.

The parameters may, for example, concern a single surface element where, for example, chevron pattern, diamond pattern and block pattern may be the choices of décor segmentation. It will here be possible to select a set of different simulations to randomly or by selected parameters fill the segments, for example, marble, birch and mahogany. The customer may also add an inlay from a design of his own which is digitised and processed, preferably automatically, to a desired format and resolution.

The parameters may alternatively include décor segments that requires the space of several surface elements, for example a map over the world. The parameters may here further include fading of the larger design to a surrounding décor, surrounding frame of other décor etc.

The customers enters the measurements of the surface that is to be covered by the surface elements. The customer then makes selections from the database and is able to see his selection as a completed surface, either on screen or by printing. The visualisation program used, is suitably also used for calculating installation pattern and presenting installation instructions with identification numbers on surface elements and where to cut the elements in order to make a perfect match. The surface elements may also be provided with removable matching lines on the decorative side making matching of décor between adjacent rows easier. The customer or dealer may then confirm his order via electronic mail where the pattern and décor is reduced to a code sequence and the order can be the direct input to the computer guiding the manufacturing process as described above. The customer and/or dealer data follows the manufacturing process all the way to packaging and a fully customer guided manufacturing process is achieved.

A supporting fibre board based core is manufactured in the desired format and is provided with an upper side, a lower side and edges. The upper side of the supporting core is then sanded smooth after which a white primer is applied. A décor is then applied on the upper side by means of a digital ink-jet four colour printer. The colours are magenta, yellow, cyan and black. The décor is positioned from a predetermined fixing point in form of a corner of the supporting core, while the décor direction is aligned with the long side edge initiating from the same corner.

The basis for the décor is stored as digital data. This digital data has been achieved by digitising a number of wood grain patterns with a digital camera. A number of rectangular blocks with a fixed width, but of varying length are selected and parted from the digital wood grain pictures. The width of the rectangular blocks is selected so that three block widths equals the width of a finished surface element. The digital image of the wood blocks are then joined digitally to form a rectangular surface of a specified size, for example, 200× 1200 mm. A selected amount of such combinations of different blocks are designed as described above so that a number of slightly different rectangular surfaces is achieved. The printer, or preferably a set of printers are positioned so that a desired number of rectangular décor surfaces with a specified intermediate distance is printed on the supporting core. The intermediate distance between the rectangular surfaces is the distance needed for parting and moulding of edges. The décor printer or printers are also used for printing fixing points at predetermined positions. Another printer, also guided by the computer, is utilised for printing an identity code on the lower side of each intended finished surface element.

A basic layer of UV-curing acrylic lacquer with an additive of 10% by weight of hard particles of α-cellulose with an average particle size in the range 10 μm is then applied on top of the printed décor by means of rollers. The lacquer is then cured with UV-light to desired viscosity.

The surface structuring is then initiated by printing the part of the structure that is to form elevations in the finished surface. A UV-curing acrylic lacquer is printed by means of an inkjet printer in the desired pattern. The pattern covers more than 95% of the total surface of the surface element. The ink-jet printer is controlled by a computer where the digital décor used earlier is processed to receive a digital structure matching the décor in aspects like grain direction and density, flaws, knots and border lines between simulated wood blocks. This processing may be achieved by an automatic process where an algorithm is used as a digital filter or by manual operation during the scanning procedure. By this procedure a surface structure matching all essential aspects of the décor is achieved. Particles with an average particle size in the range 75 μm is then sprinkled onto the still wet printed structure layer, which then is cured. Residual particles are removed, whereupon the main layer of UV-curing acrylic lacquer with an additive in the form of hard particles of α-aluminium oxide with an average size of 10 μm, is gently applied by means of a hard roller so that only the parts of the surface covered with particles will absorb the lacquer. The lacquer is then completely cured with UV-light to desired strength, whereby the finished surface element is cut into the predetermined formats which are provided with edges with joining functionality are moulded by milling. The cutting and edge moulding process is positioned from fixing point printed close to the décor. The surface elements may then be inspected by the naked eye or by a digital camera supported by a computer. The surface elements are then packed in batches and provided with identification markings.

It is, according to an alternative procedure in the process, possible to cut and mould the edges at an earlier stage in the process. It is suitable to apply and cure a protecting layer of lacquer on top of the printed décor followed by cutting and moulding of the edges. The remaining and main part of the wear layer is then applied as described in connection to process scheme 1 or 2 above.

The process above will make it possible to have a customer initiated manufacturing where even very small quantities may be produced with the same efficiency as bulk manufacturing. Even though only one décor is described in connection to the process scheme above, it becomes clear anyone skilled in the art, that décor is changed very easily in the process. All of the important steps of the manufacturing such as printing, structuring, inspection, packaging and identification marking may be controlled and supervised by central processing data.

The invention is also described through embodiment examples.

EXAMPLE 1

A supporting core of medium density fibre board were sanded smooth. A layer of primer lacquer were applied on top of the fibre board. The primer were cured after which a decor was printed on top of the primer.

The build up of a wear layer was then initiated by applying 30 g/m² of UV-curing acrylic lacquer by means of roller coating. 20 g/m² of hard particles made of α-aluminium oxide with an average particle size of 70 μm were sprinkled on the still sticky lacquer. The lacquer was then exposed to a predetermined energy amount of UV-light so that it cured only partly and the viscosity was increased. Another 30 g/m² of UV-curing acrylic lacquer was then roller coated onto the already applied layer after which another 20 g/m² of α-aluminium oxide particles with an average particle size of 70 μm were sprinkled on the still sticky second coating. The lacquer was then exposed to a predetermined energy amount of UV-light so that it cured only partly and the viscosity was increased. Three layers of UV-curing acrylic lacquer was then applied by roller coating with intermediate partial curing as a above. Each of the three layers had a surface weight of 20 g/m². The hard particles were completely embedded in the lacquer after the three layers were applied and a plane upper wear layer surface was achieved.

A structuring and top coating procedure was then initiated. A layer of UV-curing acrylic lacquer was printed by means of an ink-jet printer in a predetermined pattern on top of the previous, partly cured, layers. Narrow parts of the surface were left non-coated. 20 g/m² of α-aluminium oxide particles were sprinkled on the still wet partial coating after which the lacquer was cured with UV-curing lacquer. Residual particles were then removed resulting in a surface which partially was free from particles. A top coating procedure was then initiated by applying a topcoat lacquer which contained 10% by weight of hard particles of α-aluminium oxide with an average particle size of 10 μm by means of gentle roller coating with a hard roller so that only the parts of the surface covered with particles were coated. The first layer was applied to a surface weight of 10 g/m². The topcoat lacquer was then exposed to a predetermined energy amount of UV-light so that it cured only partly and the viscosity was increased. Further layers of the topcoat lacquer was then applied and partly cured as described above. All layers were then exposed to a predetermined energy amount of UV-light so that it cured completely.

The wear layer was then tested for abrasion resistance according to ISO 4586/2-88, where an IP value of 8200 turns was obtained. An IP value of 8200 turns is fully sufficient for floor covering materials with medium to heavy traffic like hotel lobbies, hallways and the like.

EXAMPLE 2

A supporting core of medium density fibre board were sanded smooth. A layer of primer lacquer were applied on top of the fibre board. The primer were cured after which a decor was printed on top of the primer.

The build up of a wear layer was then initiated by applying 30 g/m² of UV-curing acrylic lacquer by means of roller coating. 20 g/m² of hard particles made of α-aluminium oxide with an average particle size of 70 μm were sprinkled on the still sticky lacquer. The lacquer was then exposed to a predetermined energy amount of UV-light so that it cured only partly and the viscosity was increased. Another 30 g/m² of UV-curing acrylic lacquer was then roller coated onto the already applied layer after which another 20 g/m² of α-aluminium oxide particles with an average particle size of 70 μm were sprinkled on the still sticky second coating. The lacquer was then exposed to a predetermined energy amount of UV-light so that it cured only partly and the viscosity was increased. Three layers of UV-curing acrylic lacquer was then applied by roller coating with intermediate curing as a above. Each of the three layers had a surface weight of 20 g/m². The hard particles were completely embedded in the lacquer after the three layers were applied and a plane upper wear layer surface was achieved. Also the uppermost of the three layers of lacquer was cured to a desired viscosity.

A second décor layer was then printed on top of the wear layer. The second décor layer, which was identical to the first décor closest to the core, was oriented and positioned so that it completely matched the first décor.

A top coating procedure was then initiated. A layer of UV-curing acrylic topcoat lacquer was applied by means of a roller coater on top of the second décor layer. The topcoat lacquer contained 10% by weight of hard particles of α-aluminium oxide with an average particle size of 10 μm. The topcoat layer was applied to a surface weight of 10 g/m². The topcoat lacquer was then exposed to a predetermined energy amount of UV-light so that it cured and the viscosity was increased.

The build up of a structured upper wear layer was then initiated by applying 10 g/m² of UV-curing acrylic lacquer by means of roller coating. The surface structuring was then initiated by printing the part of the structure forming the elevated parts of the finished surface. A UV-curing acrylic lacquer with a content of silicone polymer was printed by means of an ink-jet printer in the desired pattern. The pattern covered around 95% of the total surface of the surface element. 20 g/m² of hard particles made of α-aluminium oxide with an average particle size of 70 μm were then sprinkled on the still sticky lacquer. The lacquer was then exposed to a predetermined energy amount of UV-light so that it cured only partly and the viscosity was increased. Residual particles were then removed by blowing an air stream over the surface. A top coating procedure was then initiated by applying a topcoat lacquer which contained 10% by weight of hard particles of α-aluminium oxide with an average particle size of 10 μm by means of gentle roller coating with a hard roller so that only the parts of the surface covered with particles were coated. The first topcoat layer was applied to a surface weight of 10 g/m². The topcoat lacquer was then exposed to a predetermined energy amount of UV-light so that it cured and the viscosity was increased. Further layers of the topcoat lacquer was then applied and cured as described above. All layers were then exposed to a predetermined energy amount of UV-light so that it cured completely.

The wear layer was then tested for abrasion resistance according to ISO 4586/2-88, where an IP value of 10300 turns was obtained. An IP value of 10300 turns is fully sufficient for floor covering materials with heavier traffic like airports, railway stations and the like. The second layer of décor and wear layer will add abrasion resistance without having obtained an unwanted hazy effect in the décor.

EXAMPLE 3

A supporting core of medium density fibre board were sanded smooth. A layer of primer lacquer were applied on top of the fibre board. The primer were cured after which a decor was printed on top of the primer.

The build up of a wear layer was then initiated by applying 30 g/m² of UV-curing acrylic lacquer by means of roller coating. 20 g/m² of hard particles made of α-aluminium oxide with an average particle size of 70 μm were sprinkled on the still sticky lacquer. The lacquer was then exposed to a predetermined energy amount of UV-light so that it cured and the viscosity was increased. Three layers of UV-curing acrylic lacquer was then applied by roller coating with intermediate partial curing as a above. Each of the three layers had a surface weight of 20 g/m². The hard particles were completely embedded in the lacquer after the three layers were applied and a plane upper wear layer surface was achieved.

A structuring and top coating procedure was then initiated. A layer of UV-curing acrylic lacquer was printed by means of an ink-jet printer in a predetermined pattern on top of the previous, partly cured, layers. Narrow parts of the surface were left non-coated. 15 g/m² of α-aluminium oxide particles were sprinkled on the still wet partial coating after which the lacquer was cured with UV-curing lacquer. Residual particles were then removed resulting in a surface which partially was free from particles. A top coating procedure was then initiated by applying a topcoat lacquer which contained 10% by weight of hard particles of α-aluminium oxide with an average particle size of 10 μm by means of gentle roller coating with a hard roller so that only the parts of the surface covered with particles were coated. The first layer was applied to a surface weight of 10 g/m². The topcoat lacquer was then exposed to a predetermined energy amount of UV-light so that it cured only partly and the viscosity was increased. Further layers of the topcoat lacquer was then applied and partly cured as described above. All layers were then exposed to a predetermined energy amount of UV-light so that it cured completely.

The wear layer was then tested for abrasion resistance according to ISO 4586/2-88, where an IP value of 4100 turns was obtained. An IP value of 4100 turns is fully sufficient for floor covering materials with medium to heavy traffic like hotel lobbies, hallways and the like.

EXAMPLE 4

A supporting core of medium density fibre board were sanded smooth. A layer of primer lacquer were applied on top of the fibre board. The primer were cured after which a decor was printed on top of the primer.

10 g/m² of UV-curing acrylic lacquer which contained 10% by weight of hard particles of t-aluminium oxide with an average particle size of 10 μm were applied by means of roller coating. The lacquer was then exposed to a predetermined energy amount of UV-light so that it cured and the viscosity was increased.

A structuring and top coating procedure was then initiated. A layer of UV-curing acrylic lacquer was printed by means of an ink-jet printer in a predetermined pattern on top of the previous, partly cured, layers. Narrow parts of the surface were left non-coated. 15 g/m² of α-aluminium oxide particles were sprinkled on the still wet partial coating after which the lacquer was cured with UV-curing lacquer. Residual particles were then removed resulting in a surface which partially was free from particles. A top coating procedure was then initiated by applying a topcoat lacquer which contained 10% by weight of hard particles of α-aluminium oxide with an average particle size of 10 μm by means of gentle roller coating with a hard roller so that only the parts of the surface covered with particles were coated. The first layer was applied to a surface weight of 10 g/m². The topcoat lacquer was then exposed to a predetermined energy amount of UV-light so that it cured only partly and the viscosity was increased. Further layers of the topcoat lacquer was then applied and partly cured as described above. All layers were then exposed to a predetermined energy amount of UV-light so that it cured completely.

The wear layer was then tested for abrasion resistance according to ISO 4586/2-88, where an IP value of 1800 turns was obtained. An IP value of 1800 turns could be sufficient for floor covering materials with light traffic like bedrooms, living rooms and the like.

The invention is not limited to the embodiments shown as these can be varied in different ways within the scope of the invention. It is for example possible to plane the surface by pressing one or more glazing rollers towards the surface structured wear layer before or after the complete curing stage. The glazing rollers are preferably also heated to a surface temperature above 30° C., preferably in the range 35° C.-100° C.

The hard particles added to the lacquer consists of for example silicon oxide, α-aluminium oxide or silicon carbide. According to one embodiment of the invention the main part of the hard particles consists of for example silicon oxide, α-aluminium oxide or silicon carbide while a smaller amount of the hard particles consist of diamond. The hard particles consisting of diamond is then in the average particle size range 50 nm-2 μm and is placed close to the upper surface of the wear layer.

The invention claimed is:

1. A decorative floor board comprising a decorative surface on an upper side of a base layer, said decorative floor board further comprising: a base layer of the floor board:
    said base layer comprising a core selected from the group consisting of particle board and fiber board; said core comprising an upper surface;
    a decorative surface comprising a printed décor, printed directly on the upper surface of the core; and,
    the decorative surface further comprising a first lacquer layer, the first lacquer layer overlying the printed décor on the core in a predetermined pattern as an uppermost layer on the decorative surface of the floor board, the first lacquer layer covering only parts of the decorative surface, and providing a surface structure according to said pattern, wherein the decorative surface comprises:
    the printed decor and
    a wear layer,
    wherein the wear layer is positioned between the first lacquer layer existing as a predetermined pattern and the printed decor.

2. The floor board according to claim 1, wherein the first lacquer layer comprises at least one lacquer selected from the group consisting of an acrylic, epoxy and a maleimide lacquer.

3. The floor board according to claim 1, wherein the first lacquer layer comprises several individually cured layers.

4. The floor board according to claim 1, wherein, said wear layer contains hard particles comprising at least one selected from the group consisting of aluminum oxide, silicon oxide, diamond and silicon carbide, with an average particle size in the range 50 nm-150 μm; and the additional lacquer layer exists as a planar layer over the printed décor but below the first lacquer layer in a predetermined pattern.

5. The floor board according to claim 4, wherein the hard particles comprise at least one selected from the group consisting of silicon oxide, α-aluminum oxide and silicon carbide.

6. The floor board according to claim 4, wherein the main part of the hard particles consists of at least one selected from the group consisting of silicon oxide, α-aluminum oxide and silicon carbide while a smaller amount of the hard particles consist of diamond and said hard particles are completely embedded in said lacquer of said wear layer.

7. The floor board according to claim 6, wherein the hard particles consisting of diamond is in the average particle size range 50 nm to 2 μm and is placed close to the upper surface of the wear layer.

8. The floor board according to claim 4, wherein the average particle size is at most 30 μm.

9. The floor board according to claim 1, wherein the first lacquer layer existing as a predetermined pattern is printed on said decorative surface.

10. The floor board according to claim 9, wherein the first lacquer layer existing as a predetermined pattern is translucent.

11. The floor board according to claim 9, wherein the first lacquer layer existing as a predetermined pattern includes a matting agent which creates a structure enhancing effect in the structure.

12. The floor board according to claim 1, wherein the wear layer comprises UV or electron beam curing lacquer and further comprises at least one selected from the group consisting of an acrylic, epoxy and a maleimide.

13. The floor board according to claim 1, wherein the wear layer comprises hard particles comprising at least one selected from the group consisting of aluminum oxide, silicon oxide, diamond and silicon carbide, with an average particle size in the range 50 nm to 150 μm.

14. The floor board according to claim 13, wherein the average particle size is at most 30 μm.

15. The floor board according to claim 13, wherein the hard particles are at least one selected from the group consisting of silicon oxide, α-aluminum oxide and silicon carbide.

16. The floor board according to claim 1, wherein the printed decor originates from a digitally stored original, whereby a surface structure that matches the decor in at least one feature is achieved, the at least one feature being selected from the group consisting of borderlines between simulated slabs, bars, blocks, knots, cracks, flaws and grain.

17. The floor board according to claim 16, wherein the first lacquer layer in a predetermined pattern in accordance with said decor, such that the first lacquer layer matches each borderline between simulated slab, bar, block, knot, crack, flaw and grain of the decor.

18. The floor board of claim 1, wherein the first lacquer layer is curable by electron beam or UV radiation.

19. A decorative surface element comprising a base layer comprising a core selected from the group consisting of particle board and fiber board and a decorative surface on the decorative surface element wherein a lacquer curable by radiation has been printed by means of an inkjet printer in a predetermined pattern as an uppermost layer on the decorative surface, the lacquer curable by radiation covering only parts of the decorative surface whereby the lacquer has been exposed to radiation whereby it cures whereby a surface structure is achieved, the lacquer curable by radiation includes hard particles comprising at least one selected from the group consisting of aluminum oxide, silicon oxide, diamond and silicon carbide, with an average particle size in the range 50 mn-150 μm, wherein a majority of the hard particles are selected from the group consisting of silicon oxide, α-aluminum oxide and silicon carbide while a minority of the hard particles consist of diamond.

20. A decorative surface element comprising a base layer comprising a core selected from the group consisting of particle board and fiber board and a decorative surface of the decorative surface element, the decorative surface comprising a decor layer and a wear layer, which wear layer has been applied on top of the decor layer, wherein a first lacquer layer curable by radiation has been printed in a predetermined pattern as an uppermost layer on the core, the first lacquer layer curable by radiation covering only parts of the core, leaving a portion of core uncovered by the first lacquer layer curable by radiation, whereby the first lacquer layer has been exposed to radiation whereby it cures whereby a surface structure is achieved.

* * * * *